(12) United States Patent
Covarrubias et al.

(10) Patent No.: US 9,280,453 B1
(45) Date of Patent: Mar. 8, 2016

(54) METHOD AND SYSTEM FOR TEST AUTOMATION FRAMEWORK FOR BACKUP AND RECOVERY APPLICATIONS

(71) Applicant: EMC Corporation, Hopkinton, MA (US)

(72) Inventors: Victor Covarrubias, Mountain View, CA (US); Veenu Gupta, San Jose, CA (US); Mikhail Galburt, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 210 days.

(21) Appl. No.: 14/039,019

(22) Filed: Sep. 27, 2013

(51) Int. Cl.
*G06F 11/00* (2006.01)
*G06F 11/36* (2006.01)

(52) U.S. Cl.
CPC ................................. *G06F 11/3684* (2013.01)

(58) Field of Classification Search
CPC ................................... G06F 11/3668–11/3692
See application file for complete search history.

(56) References Cited

U.S. PATENT DOCUMENTS 8,032,790 B2 * 10/2011 Chopra et al. .................. 714/32
8,914,329 B1 * 12/2014 Chandra et al. ............... 707/654

* cited by examiner

*Primary Examiner* — Michael Maskulinski
(74) *Attorney, Agent, or Firm* — Dergosits & Noah LLP; Todd A. Noah

(57) ABSTRACT

A method and system for test automation framework for backup and recovery applications is described. Initial data states are prepared for corresponding system components for a test host. A backup and recovery application is executed to store backup copies corresponding to the system components to a storage device. The initial data states are modified to modified data states corresponding to the system components. The backup and recovery application is executed to recover the backup copies from the storage device. The test host is rebooted based on recovering the backup copies. A comparison is output, via an output device, of the system components in the test host to the initial data states.

20 Claims, 3 Drawing Sheets

METHOD AND SYSTEM FOR TEST AUTOMATION FRAMEWORK FOR BACKUP AND RECOVERY APPLICATIONS

BACKGROUND

Test automation is the use of software to control the execution of tests, the comparison of actual outcomes to predicted outcomes, the setting up of test preconditions, and other test control and test reporting functions. A test automation framework is not a single tool to perform some specific testing task, but a set of tools that provide support for automated software testing in a unified manner, thereby providing a common platform for an automation engineer to do a job. If there is change to any test case for an application that is being tested, only the test case file needs to be updated, such that the driver script and startup script remain the same. The test automation framework integrates the function libraries, test data sources, object details and various reusable modules. The test automation framework is responsible for defining the format in which to express expectations, creating a mechanism to drive the application being tested, executing the tests, and reporting the results. Typically a test automation framework resides on a host computer and includes a script parser, a script execution engine, and a logger that logs and reports the test results.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
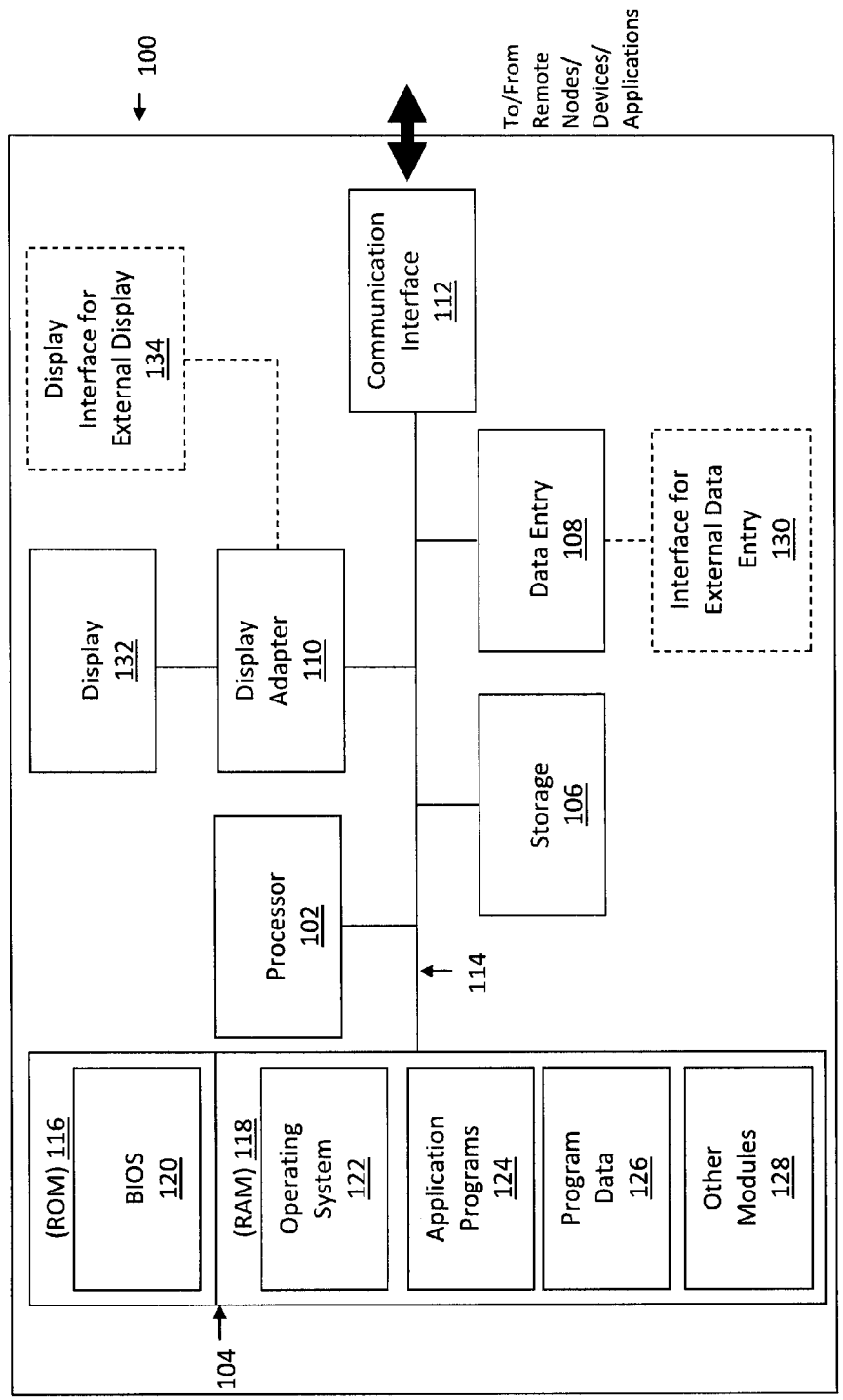
FIG. 1 is a block diagram illustrating an example hardware device in which the subject matter may be implemented.

If a software error corrupts data used by an application program, or if data is erroneously updated, an administrator may restore the data to a previous uncorrupted state that does not include the corrupted or erroneous data. A backup and recovery application executes a backup operation either occasionally or continuously to enable this restoration, storing a copy of each desired data state (the values of its data and these values' embedding in the corresponding data structures) for the corresponding application program within dedicated backup files. When the administrator decides to return the data for an application program to a previous state, the administrator specifies the desired previous state by identifying a desired point in time when the data was in this state, and instructs the backup and recovery application to execute a restore operation to restore the data for the application program with a copy of the backup files corresponding to that state. Backup and recovery programs may also create and recover backup copies of operating system components and their corresponding data. Therefore, many different combinations of system components may be required for the testing of these backup and recovery applications. A test automation framework needs to be configured for many different combinations of system components and their corresponding data to test a backup and recovery application that can backup and to recover many different combinations of system components.

Embodiments herein provide a test automation framework for backup and recovery applications. Initial data states are prepared for corresponding system components for a test host. For example, a test automation framework creates records for a domain name system server component and creates user accounts for a group policy component. A backup and recovery application is executed to store backup copies corresponding to the system components to a storage device. For example, the test automation framework executes a backup and recovery application to store backup copies of the domain name system server component and the group policy component to a remote storage node. The initial data states are modified to modified data states corresponding to the system components. For example, the test automation framework deletes records for the domain name system server component and adds user accounts for the group policy component.

The backup and recovery application is executed to recover the backup copies from the storage device. For example, the test automation framework executes the backup and recovery application to recover the backup copies of the domain name system server component and the group policy component from the remote storage node. The test host is rebooted based on recovering the backup copies. For example, the test automation framework reboots the test host based on the backup copies of the domain name system server component and the group policy component from the remote storage node. A comparison is output, via an output device, of the system components in the test host to the initial data states. For example, the test automation framework output a successful test report for the backup and recovery application based on the rebooted test host having the subsequently deleted records for the domain name system server component and not having the subsequently added user accounts for the group policy component. The test automation framework can systematically test a backup and recovery program for each specified combination of system components and their corresponding data.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for a test automation framework for backup and recovery applications.

Prior test automation frameworks face challenges in testing backup and recovery applications for combinations of system components. Embodiments herein provide a test automation framework for backup and recovery applications. The test automation framework can systematically test a backup and recovery program for each specified combination of system components and their corresponding data.

Figure 2:
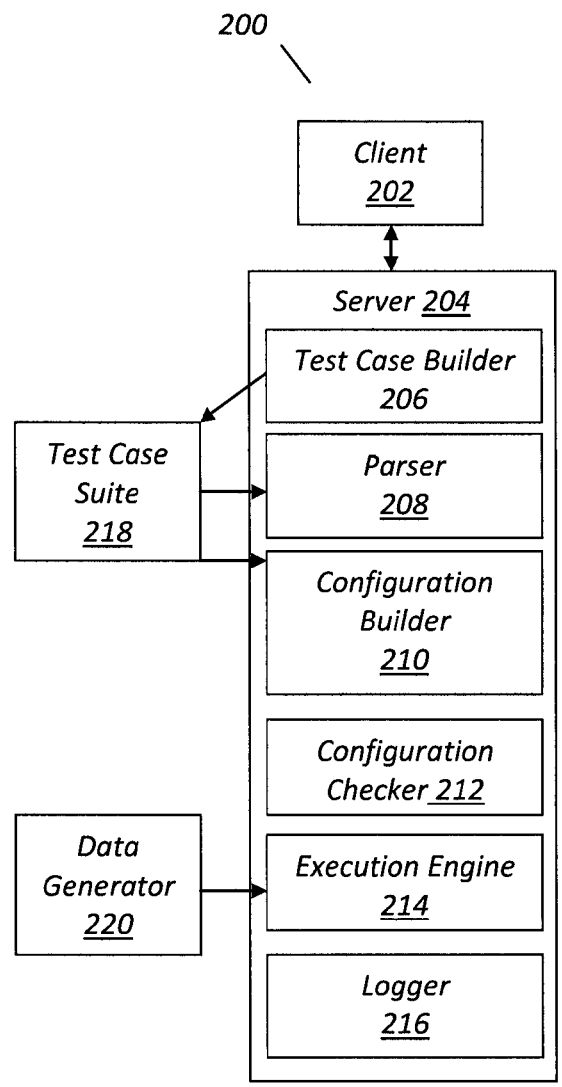
FIG. 2 illustrates a block diagram of an example system for a test automation framework for backup and recovery applications, under an embodiment.

FIG. 2 illustrates a block diagram of a system that implements a test automation framework for backup and recovery applications, under an embodiment. The test automation framework may be portable, such that it can test applications in many different environments. The test automation framework is scalable, such that the test automation framework may test a backup and recovery application on anywhere from one computer to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202, and a server 204 that is provided by a hosting company. Although FIG. 2 depicts the system 200 with one client 202 and one server 204, the system 200 may include any number of clients 202 and any number of servers 204. Each of the client 202 and the server 204 is substantially similar to the system 100 depicted in FIG. 1. The client 202 enables a user to communicate with the server 204, which functions as a test automation framework by executing a test case builder 206, a parser 208, a configuration builder 210, a configuration checker 212, an execution engine 214, and a logger 216.

The test case builder 206 receives user input that specifies configuration options, such as which system components will be used to test a backup and recovery application. The configuration options selected by the user are stored in a configuration file that is easily accessible and modifiable by the user. For example, a user inputs, via the client 202, configuration options into a configuration file, such as a domain name system server component and a group policy component. Although the examples depict system components for servers, any type, and number, and/or any combination of system components may be used. The test case builder 206 has the capability to include or exclude a particular combination of configuration options selected for exclusion or inclusion by the user.

The test case builder 206 populates a test case suite 218 based on combinations of configuration options. For example, the execution driver 206 executes a framework driver script which receives the configuration options from a framework trigger script that receives the configuration options from user input, and populates the test case suite 218 with the domain name system server component and the group policy component, as specified by a user.

A user of the system 200 may use a command line interface, which is a text-only interface, to initiate the configurable automation framework via the client 202. A command line interface may be used whenever a large vocabulary of commands or queries, coupled with a wide range of options, can be entered more rapidly as text than can be entered with a pure graphic user interface (GUI).

The parser 208 retrieves a test case that corresponds to the user-selected combination of configuration options from the test case suite 218, and parses the test case to identify script instructions to test a backup and recovery application for each combination of configuration options. For example, the parser 208 parses a test case from the test case suite 218 to identify script instructions to test a backup and recovery application using the domain name system server component and the group policy component. The test case suite 218 includes lists of test cases to be executed. The test cases include parameterization scripts that provide parameters to the test script to be executed to test a backup and recovery application, enabling the script for a single test case to be used to test the backup and recovery application for each of the configuration options. The parameterization scripts may be used to specify some options which either perform or skip specific operations for a particular script. The test case suite 218 stores the list of configuration options, predefined and customized for any particular backup and recovery application's testing.

The configuration builder 210 builds configured environments based on user input that specifies configuration options, which is stored in the test case suite 218. For example, the configuration builder engine 210 builds a test host environment based on the domain name system server component and the group policy component by preparing the domain name system server component and the group policy component. Preparing a system component insures that the system component is enabled for the test host, which may installing a system component or require nothing more than verification that a system component is already enabled for the test host. Below is an example of script that may be used to install a domain name system server component for a test host.

install DNS server, add forward lookup zone and record, add reverse lookup zone and record, # collect and output forward and reverse files' attributes in temp files
config_pshell.vbs  dns  install_server::*==>PASS*//Install the DNS server system component
config_pshell.vbs dns add_forward_lookup_zone vss_test:: *==>PASS*//Adds DNS forward lookup zone config_pshell.vbs dns add_record vss_test vss_record::
*==>PASS*//Adds DNS record pointer get_attrs c:\Windows/system32/dns/vss_test.dns $ts_tmp_path/
VSS_DNS_Server011_before-skip::
//Adds reverse lookup zone:
config_pshell.vbs dns add_reverse_lookup_zone 0.168.192.in-addr.arpa::*==>PASS*
config_pshell.vbs dns add_record 0.168.192.in-addr.arpa 20::*==>PASS*
get_attrs c:/Windows/system32/dns/0.168.192.in-addr.arpa.dns
$ts_tmp_path/VSS_DNS_Server012_before-skip::

The configuration builder 210 can clean up a previous test of a backup and recovery application. For example, the configuration builder 210 cleans up the previous test of the backup and recovery application by disabling the domain controller used for the previous test and deleting all test results, including the test results that reference the domain controller. Cleaning up a previous test insures that components and test results from the previous test do not affect the next test of the backup and recovery application or the next test results. Below is an example of script that may be used to clean up a previous test of a backup and recovery application.
clean everything left from the previous test case execution outside of temp folder
config_pshell.vbs stop_service dns::*
sleep 30::*
config_pshell.vbs dns remove_server::*
takeown If c:\\Windows\\system32\\dns/r/d Y::*now owned*administrator*
icacls c:\\Windows\\system32\\dns/grant Everyone:(OI)(CI)(F)/t::*Successfully processed*
rmdir IS/Q c: \\windows\\system3\\ndns::*

The configuration builder 210 can set up a storage device. For example, the configuration builder 210 sets up a remote storage node for the backup and recovery application to store and recover backup copies.

The configuration checker 212 determines whether the server 204 is setup for each combination of configuration options. For example, the configuration checker 212 determines that the server 204 is setup for the domain name system server component and the group policy component.

The execution engine 214 may use data from the data generator 220 to execute a script instruction. The data may be any data required for a proper backup and recovery of a corresponding system component. The data generator 220 may be a file system data generator, a SQL data generator, an exchange data generator, a Sharepoint data generator, and/or an Oracle data generator. The data generator 220 can create initial data states to correspond to system components for a test host. For example, the data generator 220 creates records for the domain name system server component and creates user accounts for the group policy component, so that the execution engine 214 can subsequently execute a test of the backup and recovery application using the data created by the data generator 220 for the domain name system server component and the group policy component.

The execution engine 214 executes the script instructions to test the backup and recovery application for each combination of configuration options if the configuration checker 212 determines that the test host is setup for each combination of configuration options. For example, the execution engine 214 executes the script instructions to test the backup and recovery application using the domain name system server component and the group policy component because the configuration checker 212 determines that the test host is setup for the domain name system server component and the group policy component.

The execution engine 214 may execute a sample test with minimal simulation to ensure that all of the components are ready for the main test before the execution engine 214 executes the main test. If the sample test fails, the configuration builder 210 may rebuild the configured environment, and the execution engine 214 may retry the sample test.

The execution engine 214 includes a test iterator that traverses through all of the applicable instances and applies the same business logic to all of the combinations of configuration options. For example, a user selected the domain name system server component and the group policy component for a test of a backup application after the previous test for which the user selected a domain controller component and the group policy component.

The execution engine 214 executes a backup and recovery application to store backup copies corresponding to system components to a storage device. For example, the execution engine 214 executes a backup and recovery application to store backup copies of the domain name system server component and the group policy component to the remote storage node. The execution engine 214 can determine whether storing backup copies passes a backup test. For example, the execution engine 214 determines whether the storing of backup copies for the domain name system server component and the group policy component passes a backup test. If the storing of backup copies passes the backup test, the execution engine 214 is ready to modify the initial data states. If the storing of backup copies fails the backup test, the execution engine 214 cleans up the configured environment, rolling back the state of the test host to the state before the preparation began of the system components. In this situation, the test automation framework may output a report about why the storing of the backup copies failed the backup test and/or restart the process for testing the backup and recovery application using the same system components that were used in the storing of backup copies that failed the backup test.

The execution engine 214 modifies the initial data states to modified data states corresponding to system components. For example, the execution engine 214 deletes forward lookup zone and reverse lookup zone records from the domain name system server component and adds user accounts for the group policy component. The execution engine 214 modifies the initial data states for the test host so that after the execution engine 214 subsequently recovers the backup copies of the initial data states, the execution engine 214 can compare the recovered backup copies of the initial data state in the rebooted test host to what the initial data states that the execution engine 214 stored separately. If the execution engine 214 determines that any of the data for the backup copies is different from the data that was stored separately, the execution engine 214 concludes that the backup and recovery application being tested did not recover the test host to its initial state. Below is an example of script that may be used to remove the records for the domain name system server component.
remove forward lookup zone's record and reverse lookup zone's record
config_pshell.vbs dns delete_record vss_test vss_record::
*==>PASS*
config_pshell.vbs dns delete_record 0.168.192.in-addr.arpa 20::*==>PASS*

The execution engine 214 executes the backup and recovery application to recover the backup copies from the storage device. For example, the execution engine 214 executes the backup and recovery application to recover the backup copies of the domain name system server component and the group policy component from the remote storage node. The execution engine 214 can determine whether recovering backup copies passes a recovery test. For example, the execution engine 214 determines whether the recovering of backup copies of the domain name system server component and the group policy component passes a recovery test. If the recovering of backup copies passes the recovery test, the execution engine 214 is ready to reboot the test host. If the recovering of backup copies fails the recovery test, the execution engine 214 cleans up the configured environment, rolling back the state of the test host to the state before the preparation began of the system components. In this situation, the test automation framework may output a report about why the recovering of the backup copies failed the recovery test and/or restart the process for testing the backup and recovery application using the same system components that were used in the recovering of backup copies that failed the recovery test.

The execution engine 214 reboots a test host based on recovering backup copies. For example, the execution engine 214 reboots the test host based on the backup copies of the domain name system server component and the group policy component from the remote storage node. At this point, the execution engine 214 is able to verify whether the backup and recovery application recovered the system components and their data to the state that they were in at the time that the backup and recovery application created and stored the backup copies. The execution engine 214 may store the initial states of the system components and their corresponding data separately from the backup copies to insure that the recovered backup copies properly restore the system components and their corresponding data to the initial state. Below is an example of script that may be used to verify whether the backup and recovery application recovered the system components and their data to the state that they were in at the time that the backup and recovery application created and stored the backup copies.

verify that zone files are in the DNS server area, collect and output file's attributes in temp file.
Compare attribute's files.
dir/B    c:\\Windows\\system32\\dns\\vss_test.dns::*vss_test.dns*
get_attrs    c:/Windows/system32/dns/vss_test.dns    $ts_tmp_path/VSS_DNS_Server011_after-skip::
diff    $ts_tmp_path/VSS_DNS_Server011_before    $ts_tmp_path/VSS_DNS_Server011_after::
dir/B c: \\Windows \\system32\\dns\\0.168.192.in-addr.arpa.dns::*0.168.192.in-addr.arpa.dns* get_attrs c:/Windows/system32/dns/0.168.192.in-addr.arpa.dns $ts_tmp_path/VSS_DNS_Server012_after-skip::
diff    $ts_tmp_pathNSS_DNS_Server012_before    $ts_tmp_path/VSS_DNS_Server012_after::

The logger 216 logs a result of executing the script instructions for each combination of configuration options, and outputs the result, which includes the comparison of system components in the test host to initial data states, via an output device, such as the client 202. For example, the logger 216 logs the test results, and outputs a report that includes the successful test report for the backup and recovery application based on the rebooted test host having the subsequently deleted records for the domain name system server component and not having the subsequently added user accounts for the group policy component.

The reports and notifications may also enable precise identification of which combination of system components failed to execute the application properly, which script instruction identified the failure, and when the failure occurred within the sequence of script instructions. If the execution of a particular script instruction failed, was unsupported, or did not run, the batch execution of the application testing does not stop because the server 204 may continue the processing of the next script instruction in the test case.

Figure 3:
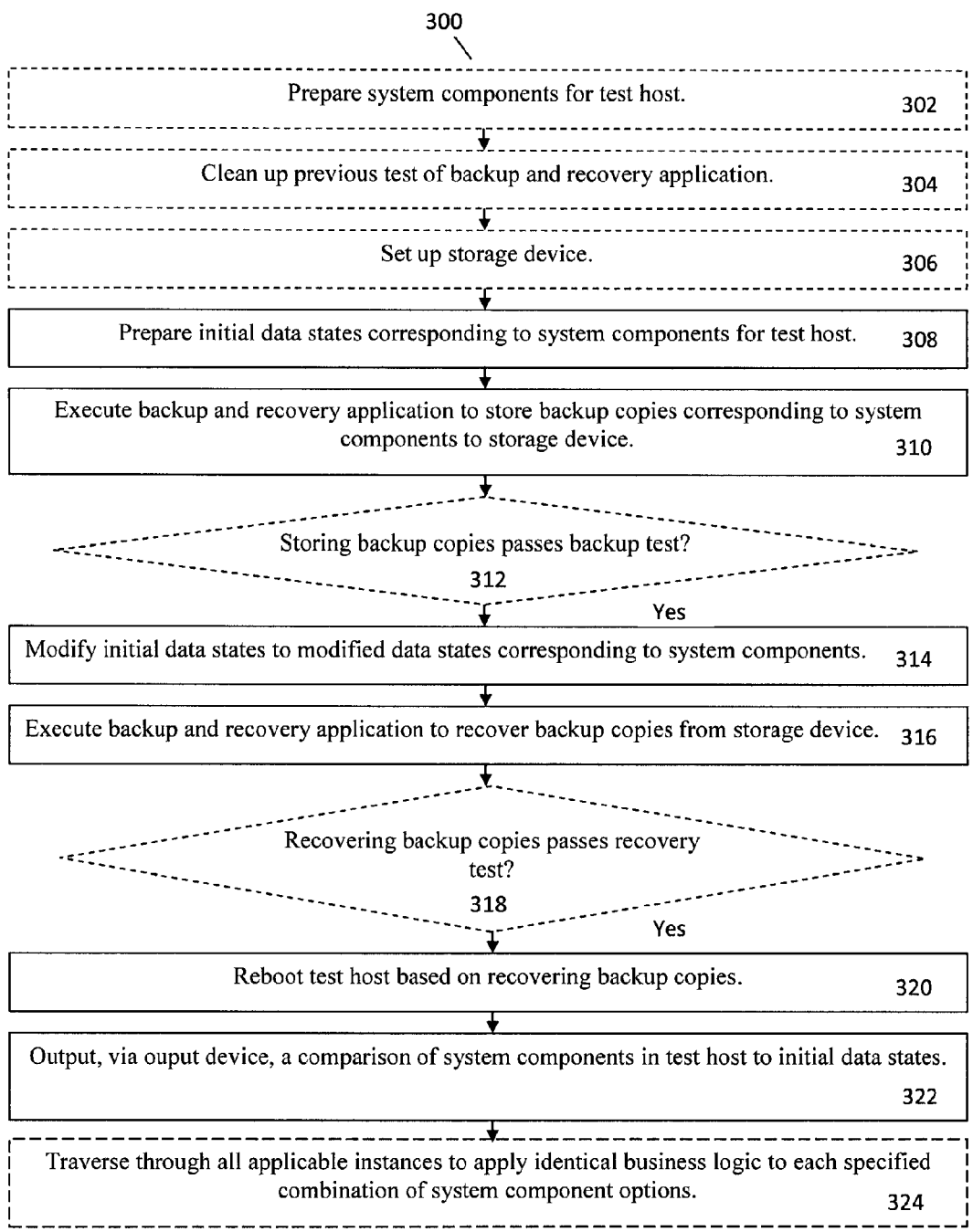
FIG. 3 is a flowchart that illustrates a method of a test automation framework for backup and recovery applications, under an embodiment.

FIG. 3 is a flowchart that illustrates a method for a test automation framework for backup and recovery applications. Flowchart 300 illustrates method acts illustrated as flowchart blocks for certain steps involved in and between the client 202 and the server 204 of FIG. 2.

System components are optionally prepared for a test host, act 302. For example, the configuration builder 210 prepares the domain name system server component and the group policy component for the test host.

A previous test of a backup and recovery application is optionally cleaned up, act 304. For example, the configuration builder 210 cleans up the previous test of the backup and recovery application.

A storage device is optionally set up, act 306. For example, the configuration builder 210 sets up a remote storage node.

Initial data states are prepared for corresponding system components for a test host, act 308. For example, the data generator 220 creates records for the domain name system server component and creates user accounts for a group policy component.

A backup and recovery application is executed to store backup copies corresponding to system components to a storage device, act 310. For example, the execution engine 214 executes a backup and recovery application to store backup copies of the domain name system server component and the group policy component to the remote storage node.

A determination is optionally made whether storing backup copies passes a backup test, act 312. For example, the execution engine 214 determines whether the storing of backup copies of the domain name system server component and the group policy component passes a backup test. If the storing of backup copies passes the backup test, the flowchart 300 continues to act 314.

Initial data states are modified to modified data states corresponding to system components, act 314. For example, the execution engine 214 deletes records for the domain name system server component and adds user accounts for the group policy component.

The backup and recovery application is executed to recover the backup copies from the storage device, act 316. For example, the execution engine 214 executes the backup and recovery application to recover the backup copies of the domain name system server component and the group policy component from the remote storage node.

A determination is optionally made whether recovering backup copies passes a recovery test, act 318. For example, the execution engine 214 determines whether the recovering of backup copies of the domain name system server component and the group policy component passes a recovery test. If the recovering of backup copies passes the recovery test, the flowchart 300 continues to act 320.

A test host is rebooted based on recovering backup copies, act 320. For example, the execution engine 214 reboots the test host based on the backup copies of the domain name system server component and the group policy component from the remote storage node.

A comparison is output, via an ouput device, of system components in the test host to initial data states, act 322. For example, the logger 216 outputs a successful test report for the backup and recovery application based on the rebooted test host having the subsequently deleted records for the domain name system server component and not having the subsequently added user accounts for the group policy component.

All applicable instances are optionally traversed to apply identical business logic to each specified combination of system component options, act 324. For example, the execution engine 214 traverses through all applicable instances to apply identical business logic to each of combination of system component options, as specified by a user.

The system 200 depicted in FIG. 2 may execute the acts 302-324 until all of the script instructions identified in the test case suite 218 depicted in FIG. 2 are executed to test the application. Although FIG. 3 depicts the acts 302-324 occurring in a specific order, the acts 302-324 may occur in another order. The test automation framework can systematically test a backup and recovery program for each specified combination of system components and their corresponding data.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for a test automation framework for backup and recovery applications, the system comprising:
    a processor-based application executed on a computer and configured to:
        prepare a plurality of initial data states corresponding to a plurality of system components for a test host;
        execute a backup and recovery application to store a plurality of backup copies corresponding to the plurality of system components to a storage device;
        modify the plurality of initial data states to a plurality of modified data states corresponding to the plurality of system components;
        execute the backup and recovery application to recover the plurality of backup copies from the storage device;
        reboot the test host based on recovering the plurality of backup copies; and
        output, via an output device, a comparison of the plurality of system components in the test host to the plurality of initial data states.

2. The system of claim 1, wherein the processor-based application is further configured to prepare the plurality of system components for the test host.

3. The system of claim 1, wherein the processor-based application is further configured to clean up a previous test of the backup and recovery application.

4. The system of claim 1, wherein the processor-based application is further configured to set up the storage device.

5. The system of claim 1, wherein the processor-based application is further configured to determine whether storing the plurality of backup copies passes a backup test, and wherein modifying the plurality of initial data states to the plurality of modified data states corresponding to the plurality of system components is in response to a determination that storing the plurality of backup copies passes the backup test.

6. The system of claim 1, wherein the processor-based application is further configured to determine whether recovering the plurality of backup copies passes a recovery test, and wherein rebooting the test host based on recovering the plurality of backup copies is in response to a determination that recovering the plurality of backup copies passes the recovery test.

7. The system of claim 1, wherein the processor-based application is further configured to traverse through all applicable instances to apply identical business logic to each specified combination of system component options.

8. A computer-implemented method for a test automation framework for backup and recovery applications, the method comprising:
    preparing a plurality of initial data states corresponding to a plurality of system components for a test host;
    executing a backup and recovery application to store a plurality of backup copies corresponding to the plurality of system components to a storage device;
    modifying the plurality of initial data states to a plurality of modified data states corresponding to the plurality of system components;
    executing the backup and recovery application to recover the plurality of backup copies from the storage device;
    rebooting the test host based on recovering the plurality of backup copies; and
    outputting, via an output device, a comparison of the plurality of system components in the test host to the plurality of initial data states.

9. The method of claim 8, wherein the method further comprises preparing the plurality of system components for the test host.

10. The method of claim 8, wherein the method further comprises cleaning up a previous test of the backup and recovery application.

11. The method of claim 8, wherein the method further comprises setting up the storage device.

12. The method of claim 8, wherein the method further comprises determining whether storing the plurality of backup copies passes a backup test, and wherein modifying the plurality of initial data states to the plurality of modified data states corresponding to the plurality of system components is in response to a determination that storing the plurality of backup copies passes the backup test.

13. The method of claim 8, wherein the method further comprises determining whether recovering the plurality of backup copies passes a recovery test, and wherein rebooting the test host based on recovering the plurality of backup copies is in response to a determination that recovering the plurality of backup copies passes the recovery test.

14. The method of claim 8, wherein the method further comprises traversing through all applicable instances to apply identical business logic to each specified combination of system component options.

15. A computer program product, comprising a non-transitory computer-readable medium having a computer-readable program code embodied therein to be executed by one or more processors, the program code including instructions to:
prepare a plurality of initial data states corresponding to a plurality of system components for a test host;
execute a backup and recovery application to store a plurality of backup copies corresponding to the plurality of system components to a storage device;
modify the plurality of initial data states to a plurality of modified data states corresponding to the plurality of system components;
execute the backup and recovery application to recover the plurality of backup copies from the storage device;
reboot the test host based on recovering the plurality of backup copies; and
output, via an output device, a comparison of the plurality of system components in the test host to the plurality of initial data states.

16. The computer program product of claim 15, wherein the program code includes further
instructions to prepare the plurality of system components for the test host.

17. The computer program product of claim 15, wherein the program code includes further
instructions to clean up a previous test of the backup and recovery application.

18. The computer program product of claim 15, wherein the program code includes further
instructions to set up the storage device.

19. The computer program product of claim 15, wherein the program code includes further
instructions to determine whether storing the plurality of backup copies passes a backup test, and wherein modifying the plurality of initial data states to the plurality of modified data states corresponding to the plurality of system components is in response to a determination that storing the plurality of backup copies passes the backup test.

20. The computer program product of claim 15, wherein the program code includes further
instructions to determine whether recovering the plurality of backup copies passes a recovery test, and wherein rebooting the test host based on recovering the plurality of backup copies is in response to a determination that recovering the plurality of backup copies passes the recovery test.

* * * * *